United States Patent
Ham (10) Patent No.: US 9,201,508 B2
(45) Date of Patent: Dec. 1, 2015

(54) ALTERNATIVE GLOVE-BASED KEY ENTRY FOR MOBILE DEVICES

(71) Applicant: Samsung Electronics Co. Ltd., Suwon-si, Gyeonggi-do (KR)

(72) Inventor: Hyoung Wook Ham, Pittsburg, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 186 days.

(21) Appl. No.: 13/930,576

(22) Filed: Jun. 28, 2013

(65) Prior Publication Data

US 2015/0002401 A1   Jan. 1, 2015

(51) Int. Cl.
*G06F 3/02* (2006.01)
*G06F 3/023* (2006.01)
*G06F 3/01* (2006.01)

(52) U.S. Cl.
CPC .............. *G06F 3/0236* (2013.01); *G06F 3/014* (2013.01)

(58) Field of Classification Search
CPC ........... G06F 3/02; G06F 3/011; G06F 3/014; G06F 3/0426

USPC ................................................... 345/156–178
See application file for complete search history.

(56) References Cited

U.S. PATENT DOCUMENTS

| | | | | |
|---|---|---|---|---|
| 5,486,112 A | * | 1/1996 | Troudet et al. | 434/250 |
| 5,571,020 A | * | 11/1996 | Troudet | 434/233 |
| 6,049,327 A | * | 4/2000 | Walker et al. | 345/158 |
| 6,098,886 A | * | 8/2000 | Swift et al. | 235/472.01 |
| 6,141,643 A | * | 10/2000 | Harmon | 704/271 |
| 6,304,840 B1 | | 10/2001 | Vance et al. | |
| 6,885,316 B2 | * | 4/2005 | Mehring | 341/21 |
| 2004/0001097 A1 | * | 1/2004 | Zngf et al. | 345/773 |
| 2004/0036678 A1 | | 2/2004 | Zngf | |
| 2005/0156895 A1 | * | 7/2005 | Ho | 345/168 |
| 2008/0129694 A1 | * | 6/2008 | Haven | 345/158 |

* cited by examiner

*Primary Examiner* — Vijay Shankar
(74) *Attorney, Agent, or Firm* — Jefferson IP Law, LLP (57) ABSTRACT

A glove-based key entry apparatus and method for are provided. The apparatus includes at least one pair of gloves, a plurality of sensors disposed on a first side of the at least a pair of gloves, and at least two screens disposed on each side of the gloves, the second side of the at least one glove being opposite to the first side of the at least one glove.

16 Claims, 6 Drawing Sheets

ALTERNATIVE GLOVE-BASED KEY ENTRY FOR MOBILE DEVICES

BACKGROUND OF THE INVENTION

1. Field of the Invention

The present invention relates to an apparatus and method for key entry on electronic devices. More particularly, the present invention relates to a glove-based key entry apparatus and method.

2. Description of the Related Art

The most common device used to enter data into an electronic device, such as a desktop computer, is a keyboard. One such type of keyboard is the QWERTY keyboard. However, the conventional QWERTY keyboard, used with a desktop computer, is large in size and has a rigid structure, therefore making the conventional QWERTY keyboard inconvenient to utilize with mobile or portable electronic devices.

Further, in the last couple of years, mobile electronic devices, such as mobile telephones, tablet computers, gaming devices, etc., have steadily replaced desktop computers as the preferred apparatus to perform functions traditionally done only by the desktop computer. This substitution of the desktop computer for portable electronic devices is mainly due to the fact that the portable electronic devices can now perform many if not all of the computing functions traditionally performed only by the desktop computer.

However, although mobile electronic devices, such as mobile telephones, tablet computers, gaming devices, etc., have touch screens, such as capacitive touch screens, which allow the user to use the touch screen as a keyboard for key entry, the screens of these portable electronic devices are of limited size. That is, the limited size of the screen of the portable electronic device makes it inconvenient for a user of the portable electronic device to use the screen as a keyboard for key entry.

Further, using a conventional QWERTY keyboard, such as those used for desktop computers, with the portable electronic device for key entry and carrying a conventional keyboard along with the mobile or portable electronic device is impractical due to the size and structure of the conventional QWERTY keyboard. Accordingly, several devices have been proposed to solve these problems.

One proposed key entry device is disclosed in U.S. Pat. No. 6,304,840. The device consists of a data glove which is used to enable ten-finger typing with a virtual keyboard. The angle at which the user's finger bends at the proximal inter-phalangeal joint is used to decode a particular row of the keyboard. Each finger controls one or more columns and discrimination between columns operated by the same finger is achieved through an abduction/adduction sensor. U.S. Pat. No. 6,304,840 further discloses that the glove is fingerless and allows normal hand function in addition to virtual typing. However, since this device uses sensors to detect an angle at which the user's finger is bent, the device has difficulty distinguishing between different rows when the user's finger is not bent correctly or within a threshold angle range. Furthermore, the device does not provide a reliable method for distinguishing between two adjacent columns which are accessed by a same finger. For example, the device does not provide a reliable method for distinguishing between the columns accessed by the left index finger which includes the column consisting of items "4" "R" "F" and "V" and the column consisting of items "5" "T" "G" "B."

Another proposed key entry device is disclosed in U.S. Patent Application Publication No. 2004/0036678. The device consists of two glove bodies with glove fingers, each of which is mounted with key buttons as a keyboard for an information system. In order to input data, the user utilizes one finger of one hand to strike on a particular key mounted on a glove finger of the other hand. A half number of the keys of a keyboard are mounted on the palm face of the glove fingers of one hand while other keys of the keyboard are mounted on the back face of the other hand. With such a keyboard and typing method, a user is able to type with ten fingers by mutually using fingers of each hand to type on the fingers of the other hand. However, this device is inconvenient to use since it has too many buttons on the gloves.

Accordingly, there is a need for a key entry apparatus and method that is convenient to use and that is portable so as to be easily adaptable for use in portable or mobile electronic devices.

The above information is presented as background information only to assist with an understanding of the present disclosure. No determination has been made and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a glove-based key entry apparatus and method.

In accordance with an aspect of the present invention, a glove-based key entry apparatus is provided. The apparatus includes at least one pair of gloves, a plurality of sensors disposed on a first side of the at least a pair of gloves, and at least two screens disposed on each side of the gloves, the second side of the at least one glove being opposite to the first side of the at least one glove.

In accordance with an aspect of the present invention, a glove-based key entry apparatus is provided. The apparatus includes a pair of gloves, a first set of sensors disposed on a first side of each glove, a second set of sensors disposed in between fingers of each glove, and at least one screen disposed on a second side of each glove, the second side of each glove being opposite to the first side of each glove.

In accordance with another aspect of the present invention, a method enabling a user of an electronic mobile device to input data into the electronic mobile device using a glove-based key entry apparatus is provided. The method includes displaying a virtual keyboard on a first surface of the glove-based key entry apparatus, selecting keys on the displayed virtual keyboard by pressing sensors disposed throughout the glove-based entry apparatus, and communicating information acquired through the selection of the keys by pressing the sensors disposed throughout the glove-based entry apparatus to the electronic mobile device.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention include a key entry apparatus and method that is convenient to use and that is portable so as to be easily adaptable for use in mobile electronic devices.

Figure 1:
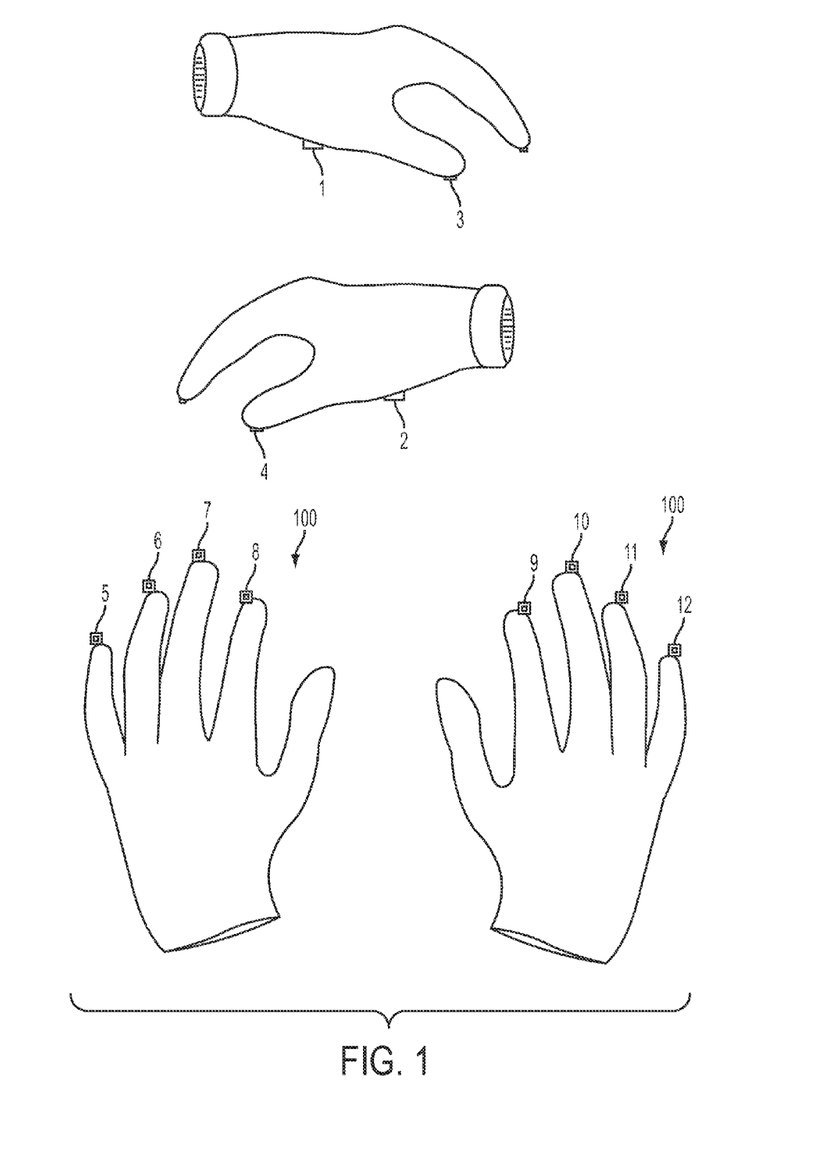
FIG. 1 illustrates side and top views of a glove-based key entry apparatus according to an exemplary embodiment of the present invention.

FIG. 1 illustrates side and top views of a glove-based key entry apparatus according to an exemplary embodiment of the present invention;

It is initially noted that the terms glove-based key entry apparatus, key entry apparatus and glove will be used interchangeably throughout the specification but refer to the same apparatus. The glove-based key entry apparatus 100 includes a plurality of sensors disposed at various locations of the glove-based key entry apparatus 100. More particularly, the glove-based key entry apparatus 100 or glove may include a plurality of sensors. For example, FIG. 1 illustrates the glove-based key entry apparatus 100 including twelve sensors. That is, the glove-based key entry apparatus 100 may include a sensor 1, a sensor 2, a sensor 3, a sensor 4, a sensor 5, a sensor 6, a sensor 7, a sensor 8, a sensor 9, a sensor 10, a sensor 11 and a sensor 12. However, as noted above, this is merely an exemplary embodiment and the glove-based key entry apparatus 100 may include more or less sensors. It is further noted that the sensors used in the glove-based key entry apparatus 100 may be pressure sensors or touch sensors or a combination of both. Further, these two types of sensors are merely exemplary and other types of sensors may be used. Additionally, these sensors may use capacitive, resistive, infrared, surface acoustic wave technology and the like for determining one or more contact points between the glove-based key entry apparatus 100 and a surface. The glove may be activated when a user puts on the gloves, by activating a switch (not shown), or by some other types of means. At least one sensor may be used to detect whether the user has put on the gloves or the switch may be activated when the user wants to activate the gloves. When the apparatus 100 is activated, the screens are activated. Similarly, when the user takes off the gloves, the glove or apparatus 100 is deactivated. However, this is merely an exemplary embodiment, and the apparatus 100 may be powered down in some other form. For example, the apparatus 100 may be powered down by pressing a switch on the glove itself (not shown). Further, it is noted that the glove may be powered through a variety of forms. For example, the apparatus 100 may be powered with a battery, a rechargeable battery, solar energy, etc. It is further noted that these forms of powering the apparatus 100 are merely exemplary and other forms of powering the apparatus 100 may be utilized.

The sensor 1 of the left hand glove and sensor 2 of the right hand glove are respectively disposed on an area of the glove-based key entry apparatus 100 corresponding to the left and right palm of the hands of the user of the glove-based key entry apparatus 100. Sensor 1 and sensor 2 are used to change or switch between rows of a virtual keyboard displayed on the back of the gloves of each hand of the apparatus 100 and which will be described later on with respect to FIG. 1. For example, sensors 1 and 2 may be used to switch between rows of a QWERTY keyboard, which is displayed on a backside or a rear of the glove-based key entry apparatus 100. A more detailed description of the displayed virtual keyboard will be provided in the description of FIG. 2. Further, the location and function of the sensors 1 and 2 are not limited to the above description and thus the sensors 1 and 2, may be disposed in different areas of the glove and perform functions in addition to or other than switching between rows.

Sensor 3 is disposed on an area of the left hand glove-based key entry apparatus 100 corresponding to a left thumb of the user of the glove-based key entry apparatus 100. Meanwhile, sensor 4 is disposed on an area of the right hand glove-based key entry apparatus 100 corresponding to a right thumb of the user of the glove-based key entry apparatus 100. Sensors 3 and 4 are used to switch and/or select special keys of respective keyboards displayed on the back of the glove-based key entry apparatus 100, such as the QWERTY keyboard. As noted above, the virtual keyboard is displayed on a backside of the glove-based key entry apparatus 100. A more detailed description of the displaying of the keyboard will be provided when describing FIGS. 2-6. For example, the sensor 3 may be used to select special keys such as CTRL, ALT and SHIFT, and so forth disposed on the QWERTY keyboard, as illustrated in FIG. 6. Meanwhile, sensor 4 may be used for the same purpose, just that such function would be performed by the right hand glove. Further, locations and functions of sensor 3 and 4 are not limited to those described above and thus locations and functions of sensors 3 and 4 can vary.

The sensors 5 to 12 are disposed on an area of the glove-based key entry apparatus 100 corresponding to fingers except for thumbs of the user of the glove-based key entry apparatus 100. The sensors 5 to 12 detect which key is pressed among the keys in the selected row of a QWERTY keyboard of each hand. Each sensor corresponds to each column. For example, sensor 5 can correspond to the column including the '1 q a z' keys based on the selected rows, selected by sensors 1 and 2. When a key is selected, the selected key may become highlighted or enlarged on the screens. Further, sensors 5 to 12 are disposed in the area corresponding to fingers of the left and right hand except for the thumbs. Additionally, sensors 5 to 12 may be used to perform functions other than selecting a key on the keyboard, when used in combination with a sensor disposed on an area corresponding to the index fingers However, this function is merely exemplary and other combinations of pressing the different sensors can be performed to achieve the same result.

Figure 2:
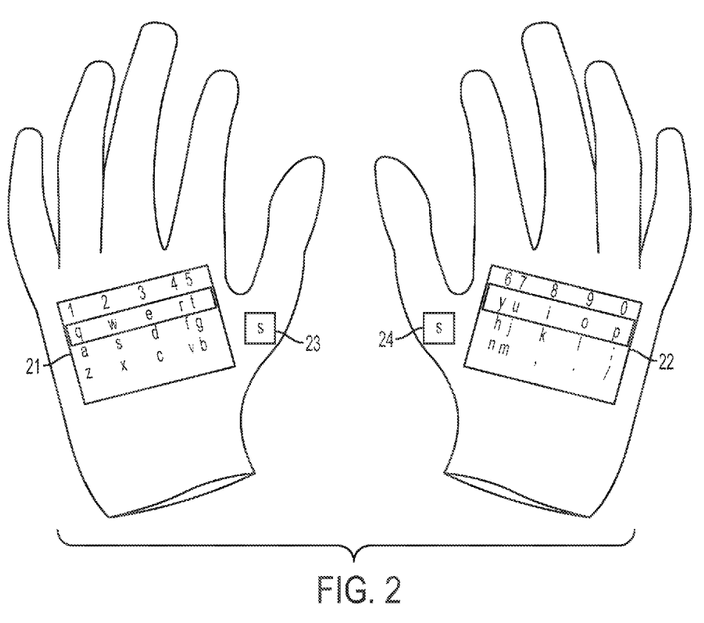
FIG. 2 illustrates a top view of a back side of a left hand and a right hand glove-based key entry apparatus according to an exemplary embodiment of the present invention.

FIG. 2 illustrates a top view of a back side of a left hand and a right hand glove-based key entry apparatus according to an exemplary embodiment of the present invention.

Referring to FIG. 2, the key entry apparatus 100 may include two gloves, a right hand glove and a left hand glove. In the instant case, a top side of the gloves or a side opposite to the palm of the hand of the user of the gloves is illustrated in FIG. 2.

Further, as illustrated in FIG. 2, each of the gloves 100 includes two screens. For example, the left hand glove may include a screen 21 and a screen 23 whereas the right hand glove may include screens 22 and 24. The screens 21 and 22, which are larger screens than screens 23 and 24, display keys corresponding to the QWERTY keyboard. For example, the screen 21 disposed on the left hand glove 100 displays the keys corresponding to a left half of the QWERTY keyboard while the screen 22 disposed on the right hand glove 100 displays the keys corresponding to a right half of the QWERTY keyboard. Meanwhile the screens 23 and 24, which are the smaller screens of the screens, are disposed on an area near the base of the thumbs of the user of the glove 100. The screens 23 and 24 display keys corresponding to special keys of the QWERTY keyboard.

Further, when a row or particular key of the keyboard is selected, which will be explained in more detail with respect to the description of FIG. 3, screens 21 and 22 can highlight and box the row of keys. It is also noted that the screens may be turned on in a variety of forms. For example, the gloves of the apparatus 100 may be turned on when a user puts on the gloves. Further, the gloves can have sensors disposed inside (not shown) or outside of them (not shown) to detect that the user is putting on the gloves and thus to activate them.

Figure 3:
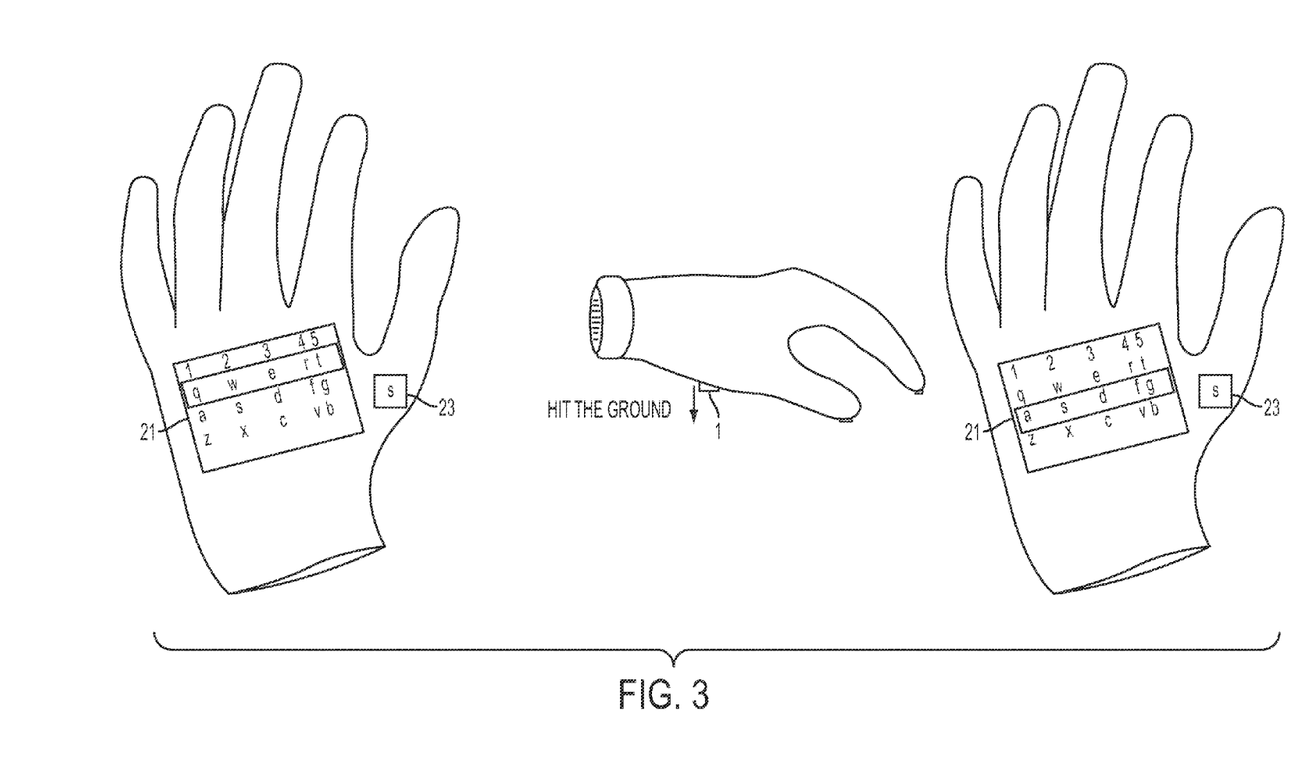
FIG. 3 is a view of a glove-based key entry apparatus illustrating switching of rows of a keyboard displayed on the glove-based key entry apparatus according to an exemplary embodiment of the present invention.

FIG. 3 is a view of a glove-based key entry apparatus illustrating switching of rows of a keyboard displayed on a glove-based key entry apparatus according to an exemplary embodiment of the present invention.

Referring to FIG. 3, the user of the glove-based key entry apparatus 100 selects between the different rows displayed on screens 21 and 22 by activating at least one of the sensors 1 and 2. Such activation can be achieved by the user pressing at least one of the sensors 1 and 2 against a surface or touching a surface. For example, when the user presses the sensor 1 of the glove-based key entry apparatus 100 the currently selected row switches to a next row. Particularly, as illustrated in FIG. 3, the currently selected row, "qwerty," is switched to the next row, "asdfg," when the user of the glove-based key entry apparatus activates sensor 1. It is noted that although FIG. 3 illustrates this process occurring on the left hand side of the glove-based key entry apparatus 100, such process is also applicable to the right hand side of the glove-based key entry apparatus 100. That is, if the user activates the sensor 2 of the right hand glove-based key entry apparatus, the currently selected row "yuiop," will switch to the next row "hjkl;" (not shown). It is further noted that the selection of the rows can be programmed according to the user's needs. For example, although FIG. 3 illustrates the rows being selected from the top to bottom, such process can occur from bottom to top. Additionally, once the user of the glove-based key entry apparatus 100 reaches a last row of the virtual QWERTY keyboard, a further activation of the sensor 1 and 2 will switch the currently selected row to the first row of the virtual QWERTY keyboard. Similarly, if the user of the glove-based key entry apparatus has programmed the apparatus to scroll from bottom to the top, once the top or first row is reached, a further activation of the sensor 1 and 2 will cause the selection of the bottom of last row of the keyboard.

Figure 4:
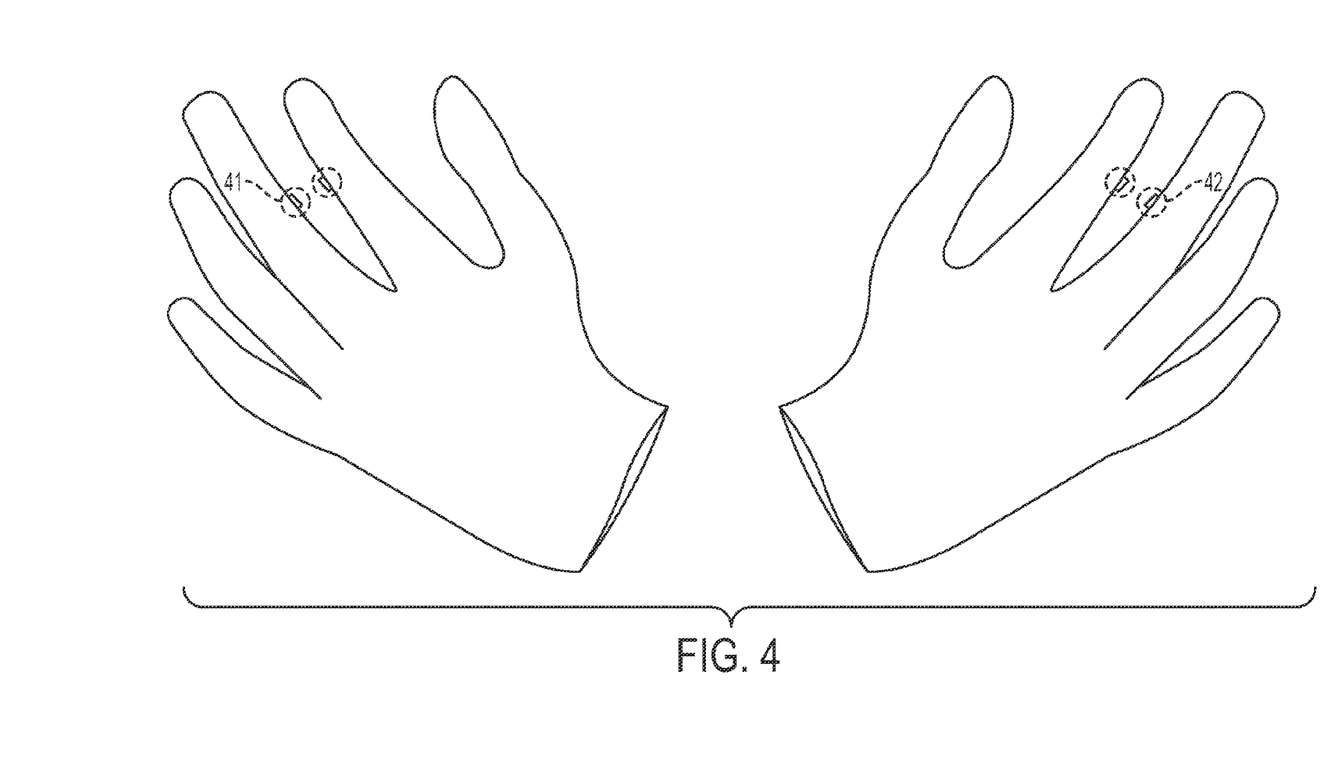
FIG. 4 illustrates a top view of a left hand glove-based key entry apparatus including proximity sensors mounted on the hand glove-based key entry apparatus according to an exemplary embodiment of the present invention.

FIG. 4 illustrates a top view of a hand glove-based key entry apparatus including proximity sensors mounted on the hand glove-based key entry apparatus according to an exemplary embodiment of the present invention.

Referring to FIG. 4, each of the left and right hand gloves-based key entry apparatus 100 includes proximity sensors. For example, the left hand glove-based key entry apparatus 100 includes proximity sensors 41 and the right hand glove-based key entry apparatus 100 includes proximity sensors 42. Particularly, FIG. 4 illustrates the proximity sensors 41 of the left hand glove-based key entry apparatus disposed between the index finger and the middle finger of the left hand glove-based key entry apparatus 100. Similarly, FIG. 4 illustrates the proximity sensors 42 of the right hand glove-based key entry apparatus disposed between the index finger and the middle finger of the right hand glove-based key entry apparatus 100. The proximity sensors 41 and 42 disposed between the index fingers and the middle fingers of each hand are used to detect which keys on different columns and/or rows of a virtual QWERTY keyboard are being selected and will be explained in more detail in accordance with the description of FIG. 5.

Figure 5:
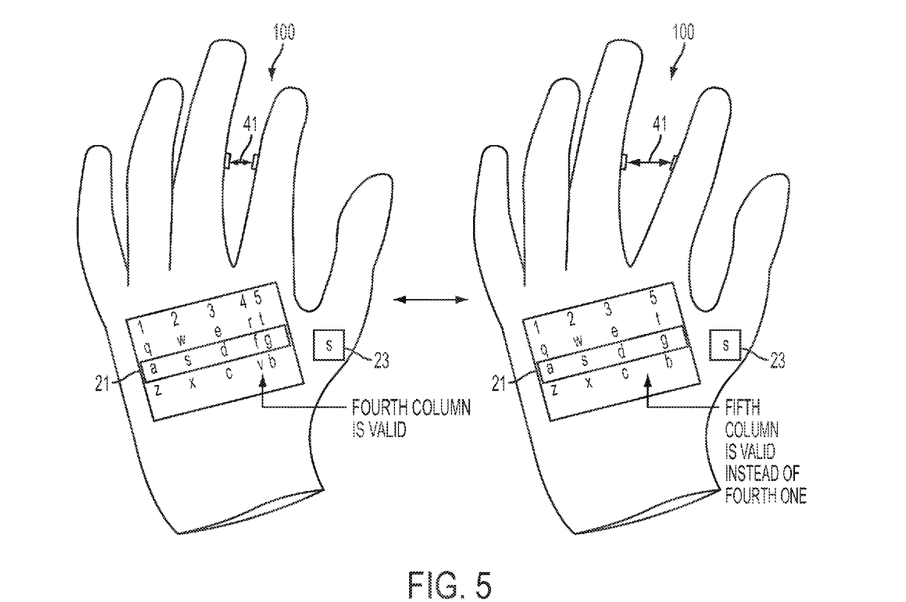
FIG. 5 is a top view of a glove-based key entry apparatus illustrating switching of columns of a keyboard displayed on the glove-based key entry apparatus according to an exemplary embodiment of the present invention.
Figure 6:
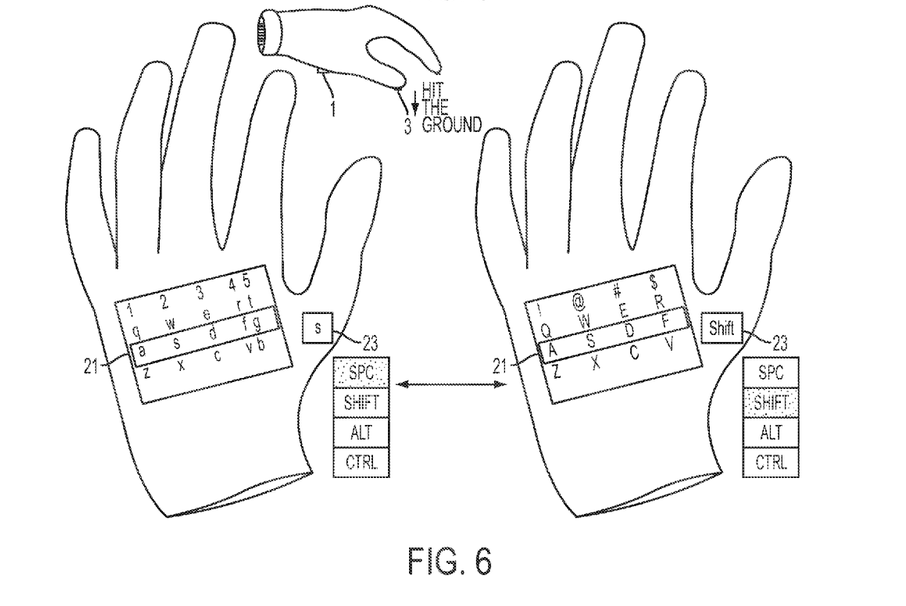
FIG. 6 is a view of a glove-based key entry apparatus illustrating switching of special keys of a keyboard displayed on the glove-based key entry apparatus according to an exemplary embodiment of the present invention.

FIG. 5 is a top view of a glove-based key entry apparatus illustrating switching of columns of a keyboard displayed on the glove-based key entry apparatus according to an exemplary embodiment of the present invention.

Referring to FIG. 5, as noted above, the proximity sensors 41 of the left hand glove-based key entry apparatus 100 may be disposed between the index finger and the middle finger of the glove-based key entry apparatus 100. The proximity sensors 41 may be used to detect which column of the displayed QWERTY keyboard of left hand the user wants to select. For example, by using the proximity sensors 41, the left hand glove-based key entry apparatus 100 can distinguish whether a user wants to select the fourth column of the virtual keyboard, which includes the "f" key, or if the user wants to select the fifth column of the virtual keyboard, which includes the "g" key. In the same way, sensors 42 of the right hand glove-based key entry apparatus 100 may be used to detect which column of the displayed QWERTY keyboard of the right hand the user wants to select. Although FIG. 4 illustrates the sensors 41 of the left hand glove-based key entry apparatus 100 and sensors 42 of the right hand glove-based key entry apparatus 100 being disposed between the index middle fingers it is to be noted that such arrangement is merely an example and the sensors may be disposed between other fingers. Similarly, various types of sensors may be used to determine the distance between the fingers. For example, these sensors may be of the capacitive type, resistive type, infrared type, surface acoustic wave technology and the like.

FIG. 6 is a view of a glove-based key entry apparatus illustrating switching of special keys of a keyboard displayed on the glove-based key entry apparatus according to an exemplary embodiment of the present invention.

Referring to FIG. 6, a process for switching between special keys of a keyboard displayed on the glove-based key entry apparatus 100 is illustrated. For example, when the user of the glove-based key entry apparatus 100 activates at least one of the sensors 3 or 4 of the glove-based key entry apparatus 100, the special keys displayed on screen 23 of the left hand-glove based key entry apparatus 100 or on screen 24, illustrated in FIG. 2, of the right hand-glove based key entry apparatus 100 are switched. Particularly, as illustrated in FIG. 6, a "SPACE" key is currently activated and displayed on screen 23. However, when the user of the glove-based key entry apparatus 100 activates the sensor 2, the "SPACE" key is switched to the "SHIFT" key. A similar function is applicable to the right hand-glove based key entry apparatus 100. That is, sensor 4 can be used to change special keys of screen 24. This process allows the user of the glove-based key entry apparatus 100 to switch between the various special functions of the keyboard displayed on the glove-based key entry apparatus 100. It is noted that although FIG. 6 illustrates the special keys being selected from a top to a bottom, such sequence is not limited thereto and the special keys can also be selected from the bottom to the top.

Figure 7:
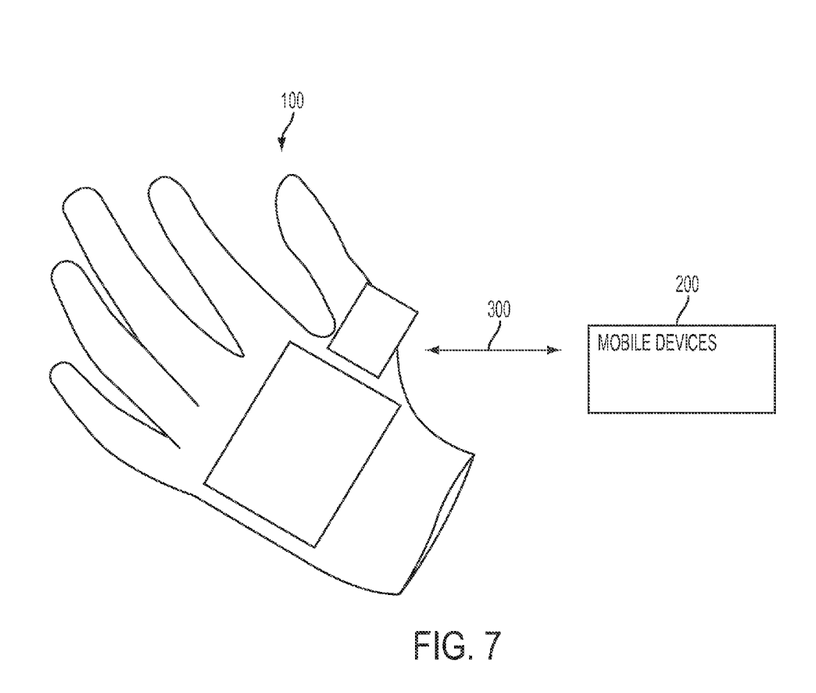
FIG. 7 illustrates a top view of a left hand glove-based key entry apparatus communicating with a mobile electronic device according to an exemplary embodiment of the present invention.

FIG. 7 illustrates a top view of glove-based key entry apparatus communicating with a mobile electronic device according to an exemplary embodiment of the present invention.

Referring to FIG. 7, the glove-based key entry apparatus 100 is shown communicating with a mobile device 200 through a communication channel 300. The mobile device 200 can be any type of mobile device, such as a mobile telephone, a gaming console and a tablet computer. However, it is noted that the mobile devices utilized in this exemplary embodiment are not limited to those described above and any other type of mobile device can be used. Further, the type of communication 300 used to connect the glove-based key entry apparatus 100 with the mobile device 200 can be any type of wired or wireless communication. For example, if a wireless communication is used, the glove-based key entry apparatus 100 may communicate with the mobile device 200 using a variety of wireless communication schemes such as a Wireless Fidelity (Wi-Fi) communication scheme, a WiMax communication scheme, a Bluetooth communication scheme, a Zigbee communication scheme, an Infrared Data Association(IrDA) communication scheme, and any other similar and/or suitable communication schemes. It is further noted that the glove-based key entry apparatus 100 may communicate with the mobile device 200 using a communication module (not illustrated).

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A glove-based key entry apparatus comprising:
at least one pair of gloves;
a plurality of pressure sensors disposed on a first side of at least one glove;
at least one screen disposed on a second side of the at least one glove, the second side of the at least one glove being opposite to the first side of the at least one glove; and
a plurality of proximity sensors disposed on areas between fingers of the at least one glove,
wherein the proximity sensors detect which key is pressed among a plurality of keys displayed on a virtual keyboard on the at least one screen.

2. The apparatus of claim 1, wherein one of the plurality of pressure sensors disposed on the first side of the at least one glove is located in an area corresponding to a palm of the user of the at least one glove.

3. The apparatus of claim 2, wherein the pressure sensor located in the area corresponding to the palm of the user is configured to change rows of the virtual keyboard displayed on the at least one screen.

4. The apparatus of claim 1, wherein one of the plurality of pressure sensors disposed on the first side of the at least one is located in an area corresponding to a thumb of the user of the at least one glove.

5. The apparatus of claim 4, wherein the pressure sensor located in the area corresponding to the thumb of the user is configured to select special keys of the virtual keyboard displayed on the at least one screen.

6. The apparatus of claim 1, wherein one of the plurality of pressure sensors disposed on the first side of the at least one glove is located in an area corresponding to an index finger of the user of the at least one glove.

7. The apparatus of claim 6, wherein the pressure sensor located in the area corresponding to the index finger is configured to detect a pressed key of the virtual keyboard displayed on the at least one screen.

8. The apparatus of claim 1, wherein the at least one screen disposed on the second side of the at least one glove is disposed on an area corresponding to a back of a hand of the user of the at least one glove.

9. The apparatus of claim 8, wherein the at least one screen disposed on an area corresponding to a back of a hand displays the virtual keyboard.

10. The apparatus of claim 1, wherein the at least one screen disposed on the second side of the at least one glove is disposed on an area corresponding to a back of a thumb of a hand of the user of the at least one glove.

11. The apparatus of claim 10, wherein the at least one screen disposed on an area corresponding to the back of the thumb of the hand of the user displays a selected special key of the virtual keyboard.

12. The apparatus of claim 1, further comprising a communication module for communicating with an external mobile device.

13. The apparatus of claim 12, wherein the communication module communicates the external mobile device using a wireless communication comprising a Wireless Fidelity (WiFi) communication, a WiMax communication, a Bluetooth communication and a Zigbee communication.

14. A glove-based key entry apparatus comprising:
   a pair of gloves;
   a first set of sensors disposed on a first side of each glove;
   a second set of sensors disposed in between fingers of each glove; and
   at least one screen disposed on a second side of each glove, the second side of each glove being opposite to the first side of each glove;
   wherein the first set of sensors are pressure sensors and the second set of sensors are proximity sensors.

15. The apparatus of claim 14, further comprising a communication module to communicate the apparatus with an external electronic device using a wireless communication comprising a Wireless Fidelity (Wi-Fi) communication, a WiMax communication, a Bluetooth communication and a Zigbee communication.

16. A method enabling a user of an electronic mobile device to input data into the electronic mobile device using a glove-based key entry apparatus, the method comprising:
   displaying a virtual keyboard on a first surface of the glove-based key entry apparatus;
   selecting keys on the displayed virtual keyboard using a plurality of sensors disposed throughout the glove-based entry apparatus; and
   communicating information acquired through the selection of the keys to the electronic mobile device,
   wherein the plurality of sensors comprises at least one pressure sensor and at least one proximity sensor.

* * * * *